(12) United States Patent
Hartmann-Thompson et al.

(10) Patent No.: US 11,780,938 B2
(45) Date of Patent: Oct. 10, 2023

(54) COPOLYMERS CONTAINING PENDANT IONOMERIC CARBOSILANE GROUPS

(71) Applicant: 3M INNOVATIVE PROPERTIES COMPANY, St. Paul, MN (US)

(72) Inventors: Claire Hartmann-Thompson, Lake Elmo, MN (US); Mark J. Pellerite, Woodbury, MN (US); Carl A. Laskowski, Minneapolis, MN (US); John Christopher Thomas, St. Paul, MN (US); Marina M. Kaplun, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/756,324

(22) PCT Filed: Dec. 3, 2020

(86) PCT No.: PCT/IB2020/061467
§ 371 (c)(1),
(2) Date: May 23, 2022

(87) PCT Pub. No.: WO2021/123997
PCT Pub. Date: Jun. 24, 2021

(65) Prior Publication Data
US 2023/0203212 A1 Jun. 29, 2023

Related U.S. Application Data

(60) Provisional application No. 62/950,234, filed on Dec. 19, 2019.

(51) Int. Cl.
C08F 8/42 (2006.01)
H01M 50/414 (2021.01)
C08F 8/32 (2006.01)
C08F 297/04 (2006.01)
C08J 5/22 (2006.01)

(52) U.S. Cl.
CPC .............. *C08F 8/42* (2013.01); *C08F 8/32* (2013.01); *C08F 297/04* (2013.01); *C08J 5/2243* (2013.01); *H01M 50/414* (2021.01); *C08J 2353/02* (2013.01)

(58) Field of Classification Search
CPC ...... C08F 8/30; C08F 8/32; C08F 8/42; C08F 30/08; C08C 19/25; C08C 19/22
See application file for complete search history.

(56) References Cited

U.S. PATENT DOCUMENTS

| 4,783,504 A * | 11/1988 | St. Clair ............ C09K 3/1018 |
| | | 524/270 |
| 5,703,163 A * | 12/1997 | Baum ................ C09D 183/10 |
| | | 525/100 |
| 5,712,326 A * | 1/1998 | Jones ...................... C08L 33/12 |
| | | 524/916 |
| 7,816,477 B2 | 10/2010 | Suwa |
| 8,748,330 B2 | 6/2014 | Debe et al. |
| 2019/0044158 A1* | 2/2019 | Wang .................... H01M 4/368 |

FOREIGN PATENT DOCUMENTS

| CN | 106008810 | * 10/2016 |
| WO | 2016014636 A1 | 1/2016 |
| WO | 2019068051 A2 | 4/2019 |
| WO | 2019177944 A1 | 9/2019 |
| WO | 2019177953 A1 | 9/2019 |
| WO | 2020229308 A1 | 11/2020 |
| WO | 2020254930 A1 | 12/2020 |

OTHER PUBLICATIONS

Translation of CN 106008810 (Year: 2016).*
Hazziza-Laskar, Journal of Applied Polymer Science, vol. 50, p. 651-662 (1993). (Year: 1993).*
International Search Report for PCT International Application No. PCT/IB2020/061467, dated Feb. 23, 2021, 4 pages.
Meek, "Polymerized ionic liquid block copolymers for electrochemical energy", Journal of Materials Chemistry A, 2015, vol. 3, No. 48, pp. 24187-24194.
Sokol, "Laboratory-scale Setup for Anionic Polymerization under Inert Atmosphere", Review of Scientific Instruments, Feb. 1995, vol. 66, No. 2, pp. 1090-1095.
Wang, "Alkaline polymer electrolyte membranes for fuel cell applications", Chemical Society Reviews, 2013, vol. 42, No. 13, pp. 5768-5787.

* cited by examiner

*Primary Examiner* — Robert C Boyle

(57) ABSTRACT

Cationic polymers are provided that comprise monomeric units of Formula (V). (V) Each asterisk (*) indicates an attachment position to another monomeric unit; R is hydrogen or methyl; each $R^2$ is each independently an alkyl, aryl, or a combination thereof; L is a linking group comprising an alkylene group; and $+R^3$ is a cationic nitrogen-containing group free of any N—H bonds. Membranes formed from said cationic polymers, devices including such membranes, and methods of making such cationic polymers are also provided.

15 Claims, No Drawings

COPOLYMERS CONTAINING PENDANT IONOMERIC CARBOSILANE GROUPS

CROSS REFERENCE TO RELATED APPLICATIONS

This application is a national stage filing under 35 U.S.C. 371 of PCT/IB2020/061467, filed Dec. 3, 2020, which claims the benefit of U.S. Provisional Patent Application No. 62/950,234, filed Dec. 19, 2019, the disclosure of which is incorporated by reference in its/their entirety herein.

GOVERNMENT RIGHTS

This invention was made with Government support under Contract No. DE-AR0000950 awarded by the U.S. Department of Energy. The Government has certain rights in this invention.

BACKGROUND

Anion exchange membranes (AEMs) are useful in various electrochemical cells such as, for example, fuel cells, electrolyzers, batteries, and electrodialysis cells. Many current AEMs are based on polymers that include pendant quaternary ammonium groups. Polymers of this type are very often brittle when dry and can tear easily when wet. In addition, many of these polymers have low solubility, which can increase the difficulty of processing the materials into membranes.

SUMMARY

There is a desire for cationic polymers having a plurality of cationic groups that can be used to make polymeric membranes, including those that could be used as AEMs with high ion exchange capacities (IECs) and that have the potential for good conductivities as well as good mechanical properties. If such polymers additionally had relatively easy, scalable synthetic methods in combination with ease of manufacturing (e.g., easy coating and/or roll-to-roll processing), the interest would be further heightened.

Disclosed herein are cationic polymers comprising monomeric units of Formula (V)

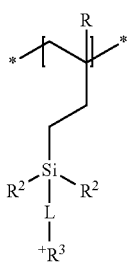

(V)

wherein
each asterisk (*) indicates an attachment position to another monomeric unit;
R is hydrogen or methyl;
each $R^2$ is independently an alkyl, aryl, or a combination thereof;
L is a linking group comprising an alkylene group; and
$+R^3$ is a cationic nitrogen-containing group free of any N—H bonds.

Also provided herein are membranes comprising disclosed cationic polymers.

Additionally, electrochemical devices are provided comprising: an anode; a cathode; and disclosed membranes positioned between the anode and cathode.

Methods of making the disclosed cationic polymers are also described herein and comprise
a) obtaining or providing a precursor polymer that is a random or block copolymer comprising at least 10 to 50 mole percent of monomeric units according to Formula (I)

(I)

wherein
R is hydrogen or methyl; and
an asterisk (*) indicates an attachment position to another monomeric unit;
b) reacting the precursor polymer comprising monomeric units of Formula (I) with an organic silane of Formula (II)

$$HSi(R^2R^2)\text{-L-X}$$ (II)

to obtain a polymer intermediate comprising monomeric units of Formula (III)

(III)

wherein
each $R^2$ is independently an alkyl, aryl, or a combination thereof;
L is a linking group comprising an alkylene group; and
X is a leaving group; and
c) reacting the polymer intermediate comprising monomeric units of Formula (III) with $R^3$, which is a nitrogen-containing base free of any N—H bonds, to obtain a cationic polymer comprising monomeric units of Formula (V)

(V)

wherein
+R³ is a cationic nitrogen-containing group free of any N—H bonds.

The above summary is not intended to describe each embodiment. The details of one or more embodiments of the invention are also set forth in the description below. Other features, objects, and advantages will be apparent from the description and from the claims.

DESCRIPTION

As used herein, the terms "a", "an", and "the" are used interchangeably and mean one or more.

As used herein, an asterisk (*) in a formula denotes the point of attachment to another group in the polymeric material. The point of attachment can be, for example, the attachment position of a pendant group to the polymeric backbone, the attachment position of a monomeric unit to another group within the polymeric material such as to another monomeric unit or to a terminal group, or the attachment site of a cationic nitrogen-containing group within a pendant group to another portion of a pendant group.

The term "and/or" is used to indicate one or both stated cases may occur, for example A and/or B includes (A and B) and (A or B). Thus, the term can be used to mean A alone, B alone, or both A and B.

The term "ion exchange membrane" is a membrane comprising ion-containing polymers (also known as ion exchange resins) in which the ion-containing polymers are typically either polycations or polyanions. The polycations or polyanions of the ion exchange membrane are typically charged species neutralized with counter ions. The counter ions of the polymers' charged functional groups are typically small, hydrophilic ions, which can migrate through the membrane polymer matrix, particularly under the influence of an electric field or a concentration gradient. If the ion exchange membrane contains polycations, it can be referred to as an "anion exchange membrane".

The terms "monomeric unit" and "repeat unit" are used interchangeably to refer to the portion of a polymeric material resulting from the polymerization of a monomer having an ethylenically unsaturated group. For example, polystyrene has monomeric units or repeat units derived from styrene that are of the following formula

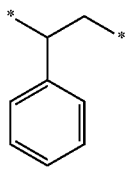

where each asterisk (*) is the location of attachment to another monomeric unit or terminal group in the polystyrene.

The term "polymer" refers to a macrostructure having at least three monomeric (or repeat) units. The polymer typically has a number average molecular weight (Mn) of at least 5,000 Daltons, at least 10,000 Daltons, at least 25,000 Daltons, at least 50,000 Daltons, at least 100,000 Daltons, at least 300,000 Daltons, at least 500,000 Daltons, at least 750,000 Daltons, at least 1,000,000 Daltons, or even at least 1,500,000 Daltons and up to 3,000,000 Daltons, up to 2,000,000 Daltons, or up to 1,000,000 Daltons. The molecular weight can be determined by gel permeation chromatography. The term polymer can refer to homopolymers, copolymers, terpolymers, and the like. The term "copolymer" refers herein to any polymeric material that contains two or more different monomeric units. The polymer can be a random or block copolymer.

The term "polymer backbone" refers to the main continuous chain of the polymer. In many embodiments, the polymer backbone is a hydrocarbon chain.

As used herein, the term "alkyl" broadly refers to monovalent linear chain and branched alkyl groups, as well as cyclic alkyl groups, having from 1 to 40 carbon atoms, 1 to 30 carbon atoms, 1 to 12 carbons or, in some embodiments, from 8 to 30 carbon atoms, 12 to 20 carbon atoms, 16 to 30 carbon atoms, 1 to 8 carbon atoms, or 1 to 4 carbon atoms. Such alkyl groups may be substituted or unsubstituted. Examples of linear chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include those with from 1 to 8 carbon atoms such as isopropyl, iso-butyl, sec-butyl, t-butyl, isopentyl, and 2,2-dimethylpropyl groups. As used herein, the term "alkyl" encompasses n-alkyl and isoalkyl groups as well as other branched chain forms of alkyl. Cyclic alkyl (i.e., cycloalkyl) groups have at least 3, at least 4, at least 5, or at least 6 carbon atoms. Examples of cycloalkyl groups include those with from 3 to 8 carbon atoms such as cyclopropyl, cyclobutyl, cyclopentyl, and cyclohexyl.

As used herein, the term "alkylene" broadly refers to divalent linear chain, branched, and cyclic alkylene (i.e., cycloalkylene) groups having from 1 to 40 carbon atoms ($C_1$-$C_{40}$), 1 to about 20 carbon atoms ($C_1$-$C_{20}$), 1 to 12 carbon atoms ($C_1$-$C_{12}$), 1 to 8 carbon atoms ($C_1$-$C_8$), 1 to 6 carbon atoms ($C_1$-$C_6$) or, in some examples, from 6 to 12 carbon atoms ($C_6$-$C_{12}$), 6 to 10 carbon atoms ($C_6$-$C_{10}$), 8 to 12 carbon atoms ($C_8$-$C_{12}$), 8 to 10 carbon atoms ($C_8$-$C_{10}$), 4 to 9 carbon atoms ($C_4$-$C_9$), 6 to 9 carbon atoms ($C_6$-$C_9$), and 6 to 8 carbon atoms ($C_6$-$C_8$). Cyclic alkylene groups have at least 3, at least 4, at least 5, or at least 6 carbon atoms. Examples of linear chain divalent alkylene groups include those having from 1 to 8 carbon atoms such as ethylene (—$CH_2CH_2$—), n-propylene (—$CH_2CH_2CH_2$—), n-butylene (—$CH_2CH_2CH_2CH_2$—), n-pentylene (—$CH_2CH_2CH_2CH_2CH_2$—), n-hexylene (—$CH_2CH_2CH_2CH_2CH_2CH_2$—), n-heptylene (—$CH_2CH_2CH_2CH_2CH_2CH_2CH_2$—), and n-octylene (—$CH_2CH_2CH_2CH_2CH_2CH_2CH_2CH_2$—) groups.

As used herein, the term "aryl" refers to monovalent cyclic aromatic groups. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some examples, aryl groups contain about 6 to about 14 carbons ($C_6$-$C_{14}$) or from 6 to 10 carbon atoms ($C_6$-$C_{10}$) in the ring portions of the groups. Aryl groups can be unsubstituted or substituted, as defined herein.

As used herein, the term "allyl" refers to a monovalent group of formula —$CH_2$—$CH=CH_2$.

As used herein, the term "substituted" broadly refers to a group (e.g., an alkyl group or an aryl group) in which at least one hydrogen atom contained therein is replaced by at least one "substituent." The term "substituted" is used to refer only to positions that are pendant on a polymer chain. Examples of substituents include, but are not limited to: alkyl, halogen (e.g., F, Cl, Br, and I), amines, and various oxygen-containing groups such as hydroxy groups, alkoxy groups, and aryloxy groups (the oxygen atom is typically the atom connected to the group that is substituted). One example is an aryl substituted by an alkyl, alkoxy, hydroxy, or halo. Another example is an alkyl substituted with an aryl, alkoxy, hydroxy, or halo.

As used herein, the terms "units of 1,4-butadiene" and "1,4-butadiene monomeric units" and similar terminology refer to the following units incorporated into the precursor polymer backbone.

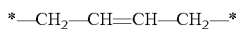

The double bond can be in a cis or trans configuration.

As used herein, the terms "units of 1,2-butadiene" and "1,2-butadiene monomeric units" and similar terminology refer to the following monomeric units incorporated into the precursor polymer backbone.

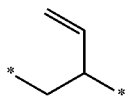

As used herein, the terms "units of 1,2-isoprene" or similar terminology refer to the following monomeric units incorporated into the precursor polymer backbone.

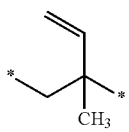

As used herein, the terms "halo" or "halogen" or "halide," by themselves or as part of another substituent, mean, unless otherwise stated, a fluorine, chlorine, bromine, or iodine atom or ion.

As used herein, the term "styrene-type monomers" or similar terminology refers to styrene and/or alpha-methyl styrene and are of either of the following formulas.

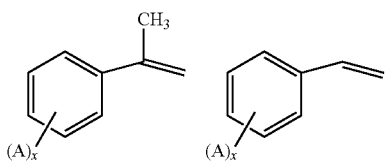

In these formulas, A is an optional alkyl and the variable x is an integer in a range from 0 to 2. That is, the aromatic ring optionally can be substituted with up to two alkyl groups. Any alkyl group substituent can have 1 to 6 carbon atoms, 1 to 4 carbon atoms, or 1 to 3 carbon atoms. The alkyl group can often be methyl or t-butyl.

As used herein, the term "leaving group" broadly refers to a group that can be displaced and replaced by a nucleophilic atom, such as a nitrogen atom. Examples of leaving groups include halogens (such as chlorine, bromine, and iodine) that are displaced as chloride, bromide, and iodide; and sulfonyl esters, such as mesyl, tosyl, and nosyl, which are displaced as mesylate, tosylate, and nosylate. While the leaving group can be any suitable leaving group, the leaving group is often chlorine or bromine for example.

The recitation herein of ranges by endpoints includes all numbers subsumed within that range (e.g., 1 to 10 includes 1.4, 1.9, 2.33, 5.75, 9.98, etc.).

The recitation herein of "at least one" includes all numbers of one and greater (e.g., at least 2, at least 4, at least 6, at least 8, at least 10, at least 25, at least 50, at least 100, etc.).

The term "about" as used herein can allow for a degree of variability in a value or range, for example, within 10%, within 5%, or within 1% of a stated value or of a stated limit of a range.

The present disclosure relates to cationic polymers having pendant carbosilane containing groups that include a cationic nitrogen-containing group that is free of N—H bonds. The cationic polymers can be used to make solid, polymeric membranes including membranes that can be used as anion exchange membranes (AEMs). The membranes can have one or more of the following properties: scalable one-pot synthesis from commercially available raw materials, good solubility enabling coating and roll-to roll processing, alkali stability, good mechanical properties, and high ion exchange capacity (IEC) with the potential for good conductivity. The cationic polymers can be made via the corresponding carbosilane-containing polymer from a precursor polymer via a method comprising:

a) obtaining or providing a precursor polymer that is a random or block copolymer comprising at least about 10 to about 50 mole percent (e.g., 10 to 50 mole percent) of monomeric units (based on the total number of moles of monomeric units in the precursor polymer) according to Formula (I)

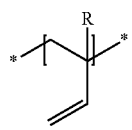 (I)

wherein

R is hydrogen or methyl; and each asterisk (*) indicates an attachment position to another monomeric unit;

b) reacting the precursor polymer having monomeric units of Formula (I) with an organic silane of Formula (II)

$$HSi(R^2R^2)\text{-}L\text{-}X \quad (II)$$

to obtain a polymer intermediate having monomeric units of Formula (III)

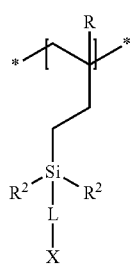 (III)

wherein
  each $R^2$ is independently an alkyl, aryl, or a combination thereof;
  L is a linking group comprising an alkylene group; and
  X is a leaving group; and
c) reacting the polymer intermediate having monomeric units of Formula (III) with $R^3$, which is a nitrogen-containing base free of any N—H bonds, to obtain a cationic polymer having monomeric units of Formula (V)

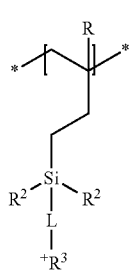

(V)

wherein $+R^3$ is a cationic nitrogen-containing group.

The precursor polymer comprises monomeric units according to Formula (I)

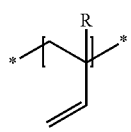

(I)

wherein R is hydrogen or methyl. When R is hydrogen, the monomeric units according to Formula (I) are derived from 1,2-butadiene. When R is methyl, the monomeric units according to Formula (I) are derived from 1,2-isoprene. Both 1,2-butadiene and 1,2-isoprene provide pendant ethylenically unsaturated groups (i.e., also referred to herein interchangeably as pendant unsaturated groups or unsaturated pendant groups) that can be readily hydrosilylated and then reacted with a nitrogen-containing base to provide an attachment point for a cationic moiety.

It is noted that most often isoprene provides lower levels of attachment points for cationic moieties than does butadiene. This is because for common industrially-practiced isoprene polymerization processes, the 3,4-isoprene, cis-1,4-isoprene, and trans-1,4-isoprene units typically dominate over the 1,2-isoprene units. That is, most commercially available isoprene contains a low concentration of 1,2-isoprene. Thus, in many embodiments, the precursor polymer is based on butadiene and the group R in Formula (1) is hydrogen.

The precursor polymer comprises the unsaturated monomeric units of Formula (I) in an amount of about 10 to about 50 mole percent (e.g., 10 to 50 mole percent) based on total moles of repeat units in the precursor polymer. This amount can be at least 10 mole percent, at least 15 mole percent, at least 20 mole percent, at least 25 mole percent, or at least 30 mole percent and up to 50 mole percent, up to 45 mole percent, up to 40 mole percent, up to 35 mole percent, up to 30 mole percent, up to 25 mole percent, or up to 20 mole percent. In some examples, the precursor polymer comprises repeat units of Formula (I) in an amount of 10 to 50 mole percent, 20 to 50 mole percent, 30 to 50 mole percent, 10 to 40 mole percent, 20 to 40 mole percent, 25 to 40 mole percent, or 30 to 40 mole percent based on total moles of repeat units in the precursor polymer. A maximum amount of the unsaturated monomeric units of Formula (I) in the precursor polymer may be dictated at least in part by the degree of swelling, water solubility, or both that may be useful in a membrane formed from a cationic polymer prepared from a particular precursor polymer. A minimum amount of the unsaturated monomeric units of Formula (I) in the precursor polymer may be dictated at least in part by a desired conductivity in a membrane formed from a cationic polymer prepared from a particular precursor polymer.

In addition to the repeat units of Formula (I), the precursor polymer can include repeat units of 1,4-butadiene, isoprene (e.g., 3,4-isoprene units, cis-1,4-isoprene units, and trans-1,4 isoprene units), or combinations thereof as well as other monomeric units such as styrene-type monomer units. The precursor polymer can be a random copolymer or a block copolymer. When the precursor is a block copolymer, the block containing the monomeric unit of Formula (I) can contain other monomers. That is, the block containing the monomeric units of Formula (I) can be a random block.

For example, the precursor polymer can be a random copolymer based on butadiene that comprises repeat units of 1,4-butadiene and 1,2-butadiene wherein the repeat units of 1,2-butadiene have the ethylenically unsaturated pendant groups. That is, the repeat units of Formula (I) are repeat units of 1,2-butadiene. In another example, the precursor polymer can be a random copolymer comprising repeat units of 1,2-isoprene, 3,4-isoprene, cis-1,4-isoprene, and trans-1,4 isoprene wherein the repeat units of 1,2-isoprene have the ethylenically unsaturated pendant groups. That is, the repeat units of Formula (I) are repeat units of 1,2-isoprene. In yet another example, the precursor polymer can be a random copolymer comprising both butadiene and isoprene repeat units. Such random copolymer can include repeat units of Formula (I) comprising repeat units of 1,2-butadiene and of 1,2-isoprene plus other repeat units that are not of Formula (I) such as 1,4-butadiene, 3,4-isoprene, cis-1,4-isoprene, trans-1-4-isoprene, or combinations thereof. In still other examples, the repeat units that are not of Formula (I) can further include styrene-type repeat units.

Alternatively, the precursor polymer can be a block copolymer. Many different types of block copolymers are possible. The block copolymer has a first block with repeat units of Formula (I). The other blocks can be free of repeat units of Formula (I) or can have a different content of repeat units of Formula (I). The different content can be based on a different amount of the monomeric unit of Formula (I) or based on a different monomeric units of Formula (I). For example, the first block can be based primarily on butadiene (i.e., the first block can be referred to as a polybutadiene block) and a second block can be based primarily on isoprene (i.e., the second block can be referred to as a polyisoprene block). In such a precursor polymer, the first block would have monomeric units of Formula (I) where R is equal to hydrogen and the second block would have monomeric units of Formula (I) where R is equal to methyl. In other example block copolymers, the first block can be based primarily on butadiene (i.e., the first block can be referred to as a polybutadiene block) and a second block can be based primarily on styrene-type monomers (i.e., the second block can be referred to as a polystyrene-type block). In still other example block copolymers, the first block can be based primarily on butadiene, a second block can be based primarily on isoprene, and a third block can be based primarily on styrene-type monomers. If the precursor polymer has three or more blocks, the blocks can be arranged in any desired order.

The amount of the repeat units in the precursor polymer that are not of Formula (I) can be in an amount of about 50 to about 90 mole percent (e.g., 50 to 90 mole percent) based on total moles of repeat units in the precursor polymer. This amount can be at least 50 mole percent, at least 55 mole percent, at least 60 mole percent, at least 65 mole percent, at least 70 mole percent, at least 75 mole percent, at least 80 mole percent and up to 90 mole percent, up to 85 mole percent, up to 80 mole percent, up to 75 mole percent, or up to 70 mole percent based on total mole of repeat units.

In one embodiment, the precursor block copolymer comprises:
at least one polybutadiene block that includes 1,2-butadiene repeat units and optionally 1,4-butadiene repeat units; and
at least one second polystyrene-type block that includes repeat units of styrene, alpha-methyl styrene, alkyl-substituted styrene and/or alpha-methylstyrene, or a mixture thereof.

As mentioned herein, the precursor polymer can be a block copolymer comprising a first polybutadiene block comprising repeat units of 1,4-butadiene and 1,2-butadiene and a second polystyrene-type block. In some embodiments, commercially available materials can be utilized as the precursor polymer. Illustrative examples can include styrene-butadiene block copolymers available from Kraton Polymers US (Houston TX).

The precursor polymer with monomeric units of Formula (I) is reacted with a silane of Formula (II)

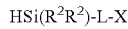 (II)

wherein
each $R^2$ is independently an alkyl, aryl, or a combination thereof
L is a linking group comprising an alkylene group; and
X is a leaving group.

Silanes of Formula (II) can also be referred to as organic silanes or organosilanes.

In some embodiments, one or both $R^2$ groups are a $C_1$ to $C_{18}$ alkyl group, a $C_1$ to $C_{10}$ alkyl group, or a $C_1$ to $C_6$ alkyl group. In some embodiments, one or both $R^2$ groups are a $C_1$ to $C_6$ alkyl group, or in some embodiments, one or both $R^2$ groups are methyl groups. In some embodiments, one or both $R^2$ groups are a $C_5$ to $C_{10}$ aryl group, a $C_5$ or $C_6$ aryl group, or a phenyl group.

In some embodiments, L is an alkylene having 1 to 18 carbon atoms, 1 to 10 carbon atoms, 1 to 6 carbon atoms, 1 to 4 carbon atoms, or 1 to 3 carbon atoms. Group L can optionally further include an arylene group, one or more silicon atoms (e.g., —Si($R^2$)$_2$— groups), an additional alkylene group, or any combination thereof. In some embodiments, L can optionally include a —Si($R^2$)$_2$— group, where $R^2$ is as defined above. In some embodiments, L has at least one alkylene group having from 1 to 18 carbons and can optionally further comprise additional alkylene group(s) having from 1 to 18 carbons, arylene group(s), —Si($R^2$)$_2$— groups, or any combination thereof. In some embodiments, L does not include any siloxane groups (e.g., Si—O groups) because they cannot be maintained in a basic environment (e.g., the environment within a functioning alkaline exchange membrane in an electrochemical device). In most embodiments, L does not include any nitrogen (N) atoms. In some embodiments, addition of a silicon atom (e.g., —Si($R^2$)$_2$— groups) into L may increase the overall flexibility of a resulting cationic polymer, which may be desirable or advantageous.

In some embodiments, X is a halogen, such that the silane of Formula (II) can be referred to as a halogenated silane, where X is chloro (—Cl), iodo (—I), or bromo (—Br). Other suitable leaving groups X include esters of sulfonic acids, including tosylate and mesylate.

In determining the identity of $R^2$ and L, it should be noted that in general, for a constant mole percent composition, the lower the overall mass of the resulting cationic repeat unit, the higher the conductivity of the cationic polymer because the cationic polymer will contain less non conductive portions with respect to the conductive portion.

The reaction of the precursor polymer with the silane of Formula (II) typically occurs in the presence of a catalyst. Any useful catalyst can be utilized herein. Illustrative examples of such catalysts can include, for example, using a hydrosilylation catalyst (e.g., a Pt catalyst such as $H_2PtCl_6$ or Karstedt's catalyst).

After reaction with the silane of Formula (II), a polymer intermediate comprising monomeric units of Formula (III) is obtained:

wherein *, R, $R^2$, L and X are as defined above.

A next step in disclosed methods includes reacting the polymer intermediate having monomeric units of Formula (III) with a nitrogen-containing base, or any compound that will result in the formation of cationic nitrogen-containing pendant groups when reacted with the polymer intermediate of Formula (III).

Nitrogen-containing bases ($R^3$) as discussed herein do not contain any nitrogen atoms bonded to hydrogen atoms (no N—H bonds). Any suitable nitrogen-containing base can be used but it is often selected from heterocyclic compounds having a nitrogen atom ring member, trialkyl amine compounds, and guanidine compounds.

In some examples, useful nitrogen-containing bases include heterocyclic compounds that have at least one nitrogen heteroatom in a heterocyclic ring. The heterocyclic compound contains a heterocyclic ring with 5 to 7 ring members (e.g., 5 or 6 ring members) and that can be saturated or unsaturated (e.g., fully as in an aromatic ring or partially unsaturated). The heterocyclic compound can optionally include additional heteroatoms such as nitrogen, oxygen, or sulfur. In many embodiments, the heterocyclic compound contains either one or two nitrogen heteroatoms and no additional heteroatoms in the heterocyclic ring. The heterocyclic ring can be unsubstituted or substituted with one or more alkyl groups and/or allyl groups and/or can be fused to an additional ring (i.e., a second ring) that is saturated or unsaturated and that is carbocyclic or heterocyclic.

Illustrative useful nitrogen-containing bases that are heterocyclic compounds include those of Formula (IVA)

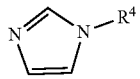
(IVA)

where $R^4$ is an alkyl or allyl.

Other illustrative examples of suitable nitrogen-containing bases that are heterocyclic compounds include imidazole compounds of Formula (IVB) that are free of N—H bonds.

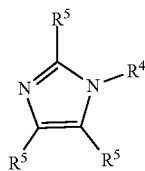
(IVB)

In Formula (IVB), $R^4$ is alkyl or allyl. Each $R^5$ is independently hydrogen or alkyl or two $R^5$ groups on adjacent carbon atoms in the ring can be joined to form a second ring that is carbocyclic or heterocyclic and that is saturated or unsaturated. The second ring usually has 5 to 7 (e.g., 5 or 6) ring members. For example, the second ring can be cyclohexane or benzene. The alkyl groups for $R^4$ and $R^5$ typically have 1 to 10 carbon atoms, 1 to 6 carbon atoms, 1 to 4 carbon atoms, or 1 to 3 carbon atoms. The alkyl groups can be linear, branched, or cyclic (depending on the number of carbon atoms). Specific examples of Formula IVB include, but are not limited to, N-methylimidazole, N-methylbenzimidazole, 1,2-dimethylimidazole, N-butylimidazole, and 1,2,4,5-tetramethylimidazole.

Other illustrative examples of suitable optional nitrogen-containing bases are heterocyclic compounds such as pyridine and alkyl-substituted pyridine compounds of Formula (IVC).

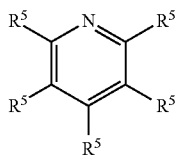
(IVC)

In Formula (IVC) each $R^5$ are independently hydrogen or alkyl or two $R^5$ groups on adjacent carbon atoms in the ring can join to form a second ring that is saturated or unsaturated and that is carbocyclic or heterocyclic. The second ring has 5 to 7 (e.g., 5 or 6) ring members. The second ring is often cyclohexane or benzene. The alkyl groups typically have 1 to 10 carbon atoms, 1 to 6 carbon atoms, 1 to 4 carbon atoms, or 1 to 3 carbon atoms. The alkyl groups can be linear, branched, or cyclic (depending on the number of carbon atoms). Pyridine is a specific example of Formula (IVC).

Still other suitable nitrogen-containing bases that can be reacted with the precursor polymer include unsaturated heterocyclic compounds with a five-membered ring such as pyrrole, pyrazole, triazole, and tetrazole as well as unsaturated compounds with a six-membered ring such as pyrimidine, pyrazine, pyridazine, and triazine. Saturated heterocyclic nitrogen-containing bases such as piperidine and piperazine can also be used. Any of these compounds can be substituted with one or more alkyl groups.

Other suitable optional nitrogen-containing bases are trialkylamines of Formula (IVD).

$$NR^6R^7R^8 \qquad (IVD)$$

In Formula (IVD), each group $R^6$, $R^7$, and $R^8$ is independently an alkyl. Suitable alkyl groups often contain 1 to 10 carbon atoms, 1 to 6 carbon atoms, 1 to 4 carbon atoms, or 1 to 3 carbon atoms. The alkyl groups can be linear, branched, or cyclic (depending on the number of carbon atoms). Specific examples include, but are not limited to, trimethylamine, triethylamine, ethyldimethylamine, butyldimethylamine, and diisopropylethylamine.

Still other suitable nitrogen-containing bases that can be reacted with the precursor polymer includes guanidine compounds (or derivatives) that are substituted with a plurality of alkyl groups and that are free of any N—H bonds. In some embodiments, the guanidinium group is fully substituted with alkyl groups. Suitable alkyl groups often contain 1 to 10 carbon atoms, 1 to 6 carbon atoms, 1 to 4 carbon atoms, or 1 to 3 carbon atoms, and the alkyl groups can be linear, branched, or cyclic (depending on the number of carbon atoms). Examples include, but are not limited to, pentamethylguanidine, 2-tert-butyl-1,1,2,2-tetramethylguanadine, and N,N-diethyl-N,N',N'-trimethylguanidine. Still other suitable alkyl-substituted guanidine compounds include compounds such as 2-methylimino-1,3-dimethylimidazolidine and 7-methyl-1,5,7-triazabicyclo[4.4.0]dec-5-ene.

The various nitrogen-containing bases are used to introduce pendant cationic nitrogen-containing groups resulting in the formation of a cationic polymer. More particularly, the nitrogen-containing bases react with the polymer intermediate having monomeric units of Formula (III). While reacting all the available monomeric units of Formula (III) with the nitrogen-containing base may increase the total ionic conductivity, adding positively-charged groups into the cationic polymer tends to increase its swelling and solubility in water or water-based solutions such as used in various electrolytes within electrochemical cells. While increased ionic conductivity is desirable for use in electrochemical cells, increased swelling and solubility tend to be undesirable. The mole percent of the monomeric units derived from reacted precursor polymer is often a compromise between ionic conductivity on one hand and swelling and solubility on the other hand. Typically, the total moles of the nitrogen-containing bases are selected to react with at least 60 mole percent, at least 65 mole percent, at least 70 mole percent, at least 75 mole percent, at least 80 mole percent, at least 85 mole percent and up to 100 mole percent, up to 99 mole percent, up to 97 mole percent, up to 95 mole percent, up to 90 mole percent, up to 85 mole percent, or up to 80 mole percent of the monomeric units of Formula (III) in the polymer intermediate.

Reaction of a nitrogen-containing base ($R^3$) with monomeric units of Formula (III) provides a cationic polymer with repeat units of Formula (V).

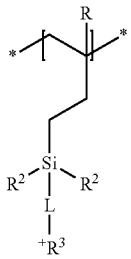

(V)

wherein
an asterisk (*) indicates an attachment position to another monomeric units;
R is hydrogen or methyl;
each $R^2$ is independently an alkyl, aryl, or a combination thereof;
L is a linking group comprising an alkylene group; and
+$R^3$ is a cationic nitrogen-containing group.

More specific possibilities of each of R, $R^2$, L, and +$R^3$ include those discussed above with respect to the precursor polymer, the silane of Formula (II), and the nitrogen-containing bases ($R^3$).

In some embodiments, one or both $R^2$ groups are a $C_1$ to $C_{18}$ alkyl group, a $C_1$ to $C_{10}$ alkyl group, or a $C_1$ to $C_6$ alkyl group. In some embodiments, one or both $R^2$ groups are each independently a $C_1$ to $C_6$ alkyl group, or in some embodiments, one or both $R^2$ groups are methyl groups. In some embodiments, one or both $R^2$ groups are a $C_5$ to $C_{10}$ aryl group, a $C_5$ or $C_6$ aryl group, or a phenyl group.

In some embodiments, L is an alkylene having 1 to 18 carbon atoms, 1 to 10 carbon atoms, 1 to 6 carbon atoms, 1 to 4 carbon atoms, or 1 to 3 carbon atoms. Group L can optionally further include an arylene group, one or more silicon atoms (e.g., —Si($R^2$)$_2$— groups), an additional alkylene group, or any combination thereof. In some embodiments, L can optionally include a —Si($R^2$)$_2$— group, where $R^2$ is as defined above. In some embodiments, L has at least one alkylene group having from 1 to 18 carbons and can optionally further comprise additional alkylene group(s) having from 1 to 18 carbons, arylene group(s), —Si($R^2$)$_2$— groups, or any combination thereof. In some embodiments, L does not include any siloxane groups (e.g., Si—O groups) because they cannot be maintained in a basic environment (e.g., the environment within a functioning alkaline exchange membrane in an electrochemical device). In most embodiments, L does not include any nitrogen (N) atoms. In some embodiments, addition of a silicon atom (e.g., —Si($R^2$)$_2$— groups) into L may increase the overall flexibility of a resulting cationic polymer, which may be desirable or advantageous.

For example, +$R^3$ is a cationic nitrogen-containing group that is free of N—H bonds. The cationic group can be derived from any of the nitrogen-containing bases described above. In many embodiments, the cationic nitrogen-containing group is derived from a nitrogen-containing base ($R^3$) that is a heterocyclic compound having a nitrogen heteroatom ring member, a trialkylamine compound, or a guanidine compound. The cationic polymer containing monomeric units of Formula (V) can also be considered as having negatively charged groups (or counter ions) to balance every positive charge present in the cationic polymer. It should be noted that there are no cations present in the backbone of the polymer itself. When the leaving group X in Formulas (II) and (III) is a halogen, a halide can serve as the counter ion to the nitrogen-containing base. Alternatively, the halide can be replaced with another counter ion.

In some embodiments, the cationic nitrogen-containing group is a heterocyclic group. The cationic nitrogen-containing group has a first heterocyclic ring that is saturated or unsaturated with 5 or 6 ring members and with at least one nitrogen heteroatom ring member. The first heterocyclic ring optionally can be fused to a second ring that is carbocyclic or heterocyclic and that is saturated or unsaturated. In some examples, the cationic nitrogen-containing heterocyclic group can be of Formula (VIA), (VIB), or (VIC) based the nitrogen-containing based described above of Formula (IVA), (IVB), or (IVC). The asterisk indicates where the cationic group is attached to group L. Groups $R^4$, $R^5$, $R^6$, $R^7$, and $R^8$ are the same as described above.

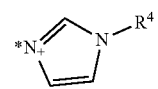

(VIA)

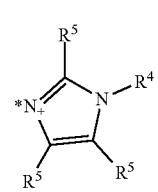

(VIB)

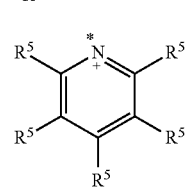

(VIC)

In other embodiments the cationic nitrogen-containing group is a group of Formula (VID)

*NR$^6$R$^7$R$^8$ (VID)

where $R^6$, $R^7$, and $R^8$ are defined above. In still other embodiments, the cationic nitrogen-containing group is formed from a nitrogen-containing base that is a guanidine compound as described above.

The cationic polymer comprises the cationic repeat units of Formula (V) in an amount of about 10 to about 50 mole percent (e.g., 10 to 50 mole percent) based on total moles of repeat units in the cationic polymer. This amount can be at least 10 mole percent, at least 15 mole percent, at least 20 mole percent, at least 25 mole percent, or at least 30 mole percent and up to 50 mole percent, up to 45 mole percent, up to 40 mole percent, up to 35 mole percent, up to 30 mole percent, up to 25 mole percent, or up to 20 mole percent. In some examples, the cationic polymer comprises repeat units having the unsaturated pendant groups in an amount of 10 to 50 mole percent, 20 to 50 mole percent, 30 to 50 mole percent, 10 to 40 mole percent, 15 to 40 mole percent, 20 to 40 mole percent, 25 to 40 mole percent, or 30 to 40 mole percent based on total moles of repeat units in the cationic polymer. A maximum amount of repeat units of Formula (V) may be dictated at least in part by the degree of swelling that is desired in a membrane formed from the cationic polymer.

A minimum amount of repeat units having the cationic pendant groups may be dictated at least in part by a desired conductivity in a membrane formed from the cationic polymer.

In addition to the repeat units of Formula (V), the cationic polymer can include repeat units that are not of Formula (V) such as, for example, monomeric units of 1,4-butadiene, isoprene (e.g., 3,4-isoprene, cis-1,4-isoprene, and trans-1,4-isoprene), or combinations thereof as well as other monomeric units such as styrene-type monomeric units. The cationic polymer can be a random copolymer or a block copolymer. When the cationic polymer is a block copolymer, the block containing the monomeric unit of Formula (V) can contain other monomers. That is the block containing the monomeric units of Formula (V) can be a random block.

For example, the cationic polymer can be a random copolymer based on butadiene that comprises repeat units of 1,4-butadiene and of Formula (V) where R is equal to hydrogen. In another example, the cationic polymer can be a random copolymer comprising repeat units selected from 3,4-isoprene, cis-1,4-isoprene, trans-1,4-isoprene, or combinations thereof in addition to repeat units of Formula (V) where R is equal to methyl. In yet another example, the cationic polymer can be a random copolymer comprising both butadiene and isoprene repeat units. Such random copolymers can include repeat units of Formula (V) with R equal to hydrogen, repeat units of Formula (V) where R is equal to methyl, and other repeat units that are not of Formula (V) such as 1,4-butadiene, 3,4-isoprene, cis-1,4-isoprene, trans-1-4-isoprene, or combinations thereof. In still other examples, the repeat units that are not of Formula (V) can further include styrene-type repeat units.

Alternatively, the cationic polymer can be a block copolymer. Many different types of block copolymers are possible. The block copolymer has a first block with repeat units of Formula (V). The other blocks can be free of repeat units of Formula (V) or can have a different content of repeat units of Formula (V). The different content can be based on a different amount of the monomeric unit of Formula (V) or based on a different monomeric units of Formula (V). For example, the first block can include monomeric units of Formula (V) where R is equal to hydrogen and a second block can include monomeric units of Formula (V) where R is equal to methyl. In other example block copolymers, the first block can contain monomeric units of Formula (V) and a second block can be based primarily on styrene-type monomers (i.e., the second block can be referred to as a polystyrene-type block). In still other examples of block copolymers, the first block includes monomeric units of Formula (V) where R is equal to hydrogen, the second block includes monomeric units of Formula (V) where R is equal to methyl, and a third block that is a polystyrene-type block (formed from styrene-type monomers). If the cationic polymer has three or more blocks, the blocks can be arranged in any desired order.

The amount of the repeat units in the cationic polymer that are not of Formula (V) can be in an amount of about 50 to about 90 mole percent (e.g., 50 to 90 mole percent) based on total moles of repeat units in the precursor polymer. This amount can be at least 50 mole percent, at least 55 mole percent, at least 60 mole percent, at least 65 mole percent, at least 70 mole percent, at least 75 mole percent, at least 80 mole percent and up to 90 mole percent, up to 85 mole percent, up to 80 mole percent, up to 75 mole percent, or up to 70 mole percent based on total mole of repeat units.

In one embodiment, the cationic polymer comprises:

at least one block that includes Formula (V) repeat units where R is hydrogen and optionally 1,4-butatdiene repeat units; and at least one second polystyrene-type block.

In some embodiments, the cationic polymer is a block copolymer comprising a first block comprising repeat unit of 1,4-butadiene and of Formula (V) where R is equal to hydrogen and a second block that is a polystyrene-type block. Additionally, copolymers having additional blocks are also possible such as triblocks and pentablocks.

Cationic polymers having repeat units to Formula (V) can also optionally be hydrogenated after being formed, or before reaction with the nitrogen base. Hydrogenation decreases the number of carbon-carbon double bonds in the hydrocarbon backbone. After hydrogenating, no more than 20 mole percent of the carbons in the hydrocarbon backbone are typically in double bonds. In some embodiments, no more than 15 mole percent, no more than 10 mole percent, no more than 5 mole percent, no more than 2 mole percent, or no more than 1 mole percent of the carbons in the hydrocarbon backbone are in double bonds. That is the amount of unsaturation in the hydrocarbon backbone is lowered during hydrogenation. Hydrogenation can be accomplished using a hydrogenation catalyst, for example.

The cationic polymers having a plurality of cationic groups can be used to make membranes (e.g., solid, polymeric membranes), including membranes that can be used as anion exchange membranes (AEMs).

AEMs of the present disclosure are, in some examples, solid, meaning that it does not readily flow when poured. For example, they may have a viscosity at ambient conditions of greater than $10^{10}$, $10^{11}$, $10^{12}$, or even $10^{13}$ Pascal seconds.

In one embodiment, AEMs of the present disclosure are dense, meaning they can form a continuous, nonporous film or layer.

In another embodiment, the AEMs of the present disclosure are porous, meaning the membranes contain open passages passing from one major surface of the membrane to the opposite major surface. Examples include membranes classified as ultrafiltration membranes, nanofiltration membranes, microfiltration membranes, etc. These membranes typically have a nominal pore diameter of at least 0.02 micrometers.

As discussed herein, the groups represented by the cationic groups can be present as pendant groups off the polymer backbone. AEMs of the present disclosure comprise at least one cationic group, but in some examples comprises an equivalent weight (grams of polymer per mole of ionic group) of 2000 or less, 1000 or less, 500 or less, 350 or less, 250 or less or even 200 or less. In some embodiments, AEMs of the present disclosure have an equivalent weight (grams of polymer per mole of ionic group) of from 300 to 2000.

The AEMs of the present disclosure can be described by their ion exchange capacity (IEC). In some embodiments, AEMs of the present disclosure may have IEC values as low as 0.5 millimoles/gram (mmol/g), as low as 1 mmol/g or even as low as 2 mmol/g to as high as 3.5 mmol/g, or as high as 3.3 mmol/g.

The AEMs of the present disclosure may be made using techniques known in the art, for example, by casting a liquid composition comprising the cationic polymer, and drying and optionally annealing to form a membrane; or by extrusion of the molten cationic polymer. If desired, the cationic polymer can also optionally be crosslinked using any known crosslinking method.

In one embodiment, the AEMs of the present disclosure comprise a reinforcement material, such as a porous support (e.g., a woven or nonwoven material made of a suitable material, such as a fluoropolymer, including expanded polytetrafluoroethylene, polyolefins such as porous polyethylene or polypropylene, electrospun nanofibers, fiberglass, polymer fibers, fiber mats, perforated films, and porous ceramics), which is imbibed (e.g., saturated or coated) with a liquid composition comprising a cationic polymer described herein either neat or containing solvent (e.g., dissolved in a suitable solvent), followed by removal of the solvent (if present) to embed the polymer into the pores of the reinforcement material. The porous support can be electrically non-conductive.

In one embodiment, AEMs of the present disclosure can have a thickness of less than 100 micrometers, less than 50 micrometers, or even less than 25 micrometers, and greater than 100 nanometers. In one embodiment, the distance between the anode and the cathode can be less than 100 micrometers, less than 50 micrometers, or even less than 25 micrometers, and greater than 100 nanometers.

AEMs of the present disclosure can have a swelling ratio. The swelling ratio can be characterized by the linear expansion ratio either in the chloride form or in the hydroxide form, which can be determined using the difference between wet and dry dimensions of a membrane sample (e.g., a sample measuring 3 cm in length and 1 cm in width) using equation (1):

$$SW(\%) = \frac{X_{wet} - X_{dry}}{X_{dry}} \times 100\% \qquad (1)$$

where $X_{wet}$ and $X_{dry}$ are the lengths of a wet and a dry membrane, respectively.

The swelling ratio in the chloride form can be less than about 60%, less than about 50%, less than about 40%, less than about 30%, less than about 20%, less than about 10% or less than about 5%. For example, the swelling ratio can be, on the upper end, about 60%, about 55%, about 50%, about 45%, about 40%, about 35% or about 30% and, on the lower end, about 25%, about 20%, about 15%, about 10%, about 5% or about 1%.

The swelling ratio in the hydroxide form can be less than about 90%, less than about 85%, less than about 80%, less than about 75%, less than about 70%, less than about 65%, less than about 60%, less than about 55%, less than about 50%, less than about 45%, less than about 40%, less than about 35% or less than about 30%. For example, the swelling ratio can be, on the upper end, about 90%, about 80%, about 70%, about 60% or about 50% and, on the lower end, about 45%, about 40%, about 35%, about 30%, about 25% or about 20%.

AEMs of the present disclosure can be placed between two electrodes, the anode and cathode, of an electrochemical device. In some embodiments, the electrode is a gas diffusion electrode comprising a gas diffusion layer coated with a catalyst. Gas diffusion layers are known in the art and include for example carbon paper or cloth, or a metal mesh.

Membranes according to the present disclosure may be useful, for example, as AEMs for electrolyzers, electrodialysis cells, fuel cells, and batteries.

Electrode materials can include, for example, graphitic carbon, glassy carbon, or any of the following "catalytically active elements": Ti, V, Cr, Mn, Fe, Co, Ni, Cu, Sn, Zr, Zn, Nb, Mo, Ru, Rh, Pd, Ag, Cd, Hf, Ta, W, Re, Os, Ir, Pt, Au, Hg, Al, Si, In, Tl, Pb, Bi, Sb, Te, U, Sm, Tb, La, Ce, Nd, and alloys or combinations thereof.

In one embodiment, the electrochemical device comprises catalytically active nanoparticles. The nanoparticles may be supported on carbon particles or nanostructured supports, such as carbon nanotubes or nanostructured thin films (NSTF) as disclosed, for example, in U.S. Pat. No. 8,748,330 (Debe, et al.).

In one embodiment, the electrochemical device comprises an extended surface area catalyst-based electrode such as a nanostructured thin film electrode, nanotube electrode, porous sponge electrode, or two-dimensional polycrystalline film electrode.

In one embodiment, the cathode of the electrochemical device comprises a metal selected from silver, gold, copper, nickel, iron, or combinations thereof.

In one embodiment, the anode of the electrochemical device comprises a metal selected from ruthenium, iridium, platinum, titanium, or combinations thereof. In one embodiment, the anode of the electrochemical device comprises a metal selected from cobalt, nickel, iron, or combinations thereof. In one embodiment, the electrochemical device is substantially free of platinum, meaning the electrode comprises less than 0.1%, less than 0.01% or even less than 0.001% by weight of platinum.

The cathode, the anode, and/or AEMs of the present disclosure can be assembled each as a separate component or can be fabricated wherein the AEM (or a portion thereof) is fabricated with one or both electrodes or a portion thereof. For example, to maximize cost savings and, in some instances, performance, the individual components, or layers thereof, may be sufficiently thin, such that some of the components could act as a support during the fabrication of a thin layer. The various components or portions thereof can be laminated together, formed in situ on a surface of a component, and/or coated onto a component.

The membrane electrode assembly comprising the anode, cathode and an AEM of the present disclosure can be sandwiched between two flow field plates and then held together such that each layer is in contact, preferably intimate contact with the adjacent layers.

Illustrative embodiments of the present disclosure are as follows:

Embodiment 1 relates to a cationic polymer comprising monomeric units of Formula (V):

wherein
an asterisk (*) indicates an attachment position to another monomeric units;
R is hydrogen or methyl;
each $R^2$ is independently an alkyl, aryl, or a combination thereof;
L is a linking group comprising an alkylene group; and
$+R^3$ is a cationic nitrogen-containing group free of any N—H bonds.

Embodiment 2 relates to the cationic polymer according to Embodiment 1, having from about 10 to about 50 mole percent (e.g., 10 to 50 mole percent) of monomeric units of Formula (V) based on total moles of monomeric units in the cationic polymer.

Embodiment 3 relates to cationic polymers according to either of Embodiments 1 or 2 further comprising styrene-type monomeric units, 1,4-butadiene based monomeric units, isoprene based monomeric units (those that are not of Formula (V)), or combinations thereof.

Embodiment 4 relates to cationic polymers according to either of Embodiments 1 or 2 further comprising styrene-type monomeric units.

Embodiment 5 relates to cationic polymers according to any of Embodiments 1 to 4, wherein at least one $R^2$ is a $C_1$ to $C_{18}$ alkyl group, a $C_1$ to $C_{10}$ alkyl group, or a $C_1$ to $C_6$ alkyl group.

Embodiment 6 relates to cationic polymers according to any of Embodiments 1 to 5, wherein at least one $R^2$ is a $C_1$ to $C_6$ alkyl group.

Embodiment 7 relates to cationic polymers according to any of Embodiments 1 to 6, wherein at least one $R^2$ is a methyl group.

Embodiment 8 relates to cationic polymers according to any of Embodiments 1 to 4, wherein at least one $R^2$ is a $C_5$ to $C_{10}$ aryl group.

Embodiment 9 relates to cationic polymers according to any of Embodiments 1 to 4, wherein at least one $R^2$ is a $C_5$ or $C_6$ aryl group.

Embodiment 10 relates to cationic polymers according to any of Embodiments 1 to 4 wherein at least one $R^2$ is a phenyl group.

Embodiment 11 relates to cationic polymers according to any of Embodiments 1 to 10, wherein L is an alkylene and optionally further comprises an arylene group, a group of formula —Si($R^2$)$_2$— (wherein each $R^2$ is alkyl, aryl, or a combination thereof), a second alkylene group, or a combination thereof.

Embodiment 12 relates to cationic polymers according to any of Embodiments 1 to 11, wherein L is an alkylene having 1 to 18 carbon atoms and optionally further comprises one or more silicon atoms (e.g., —Si($R^2$)$_2$— groups).

Embodiment 13 relates to cationic polymers according to any of Embodiments 1 to 12, wherein +$R^3$ is a cationic nitrogen-containing group derived from a nitrogen-containing base that is free of N—H bonds, the nitrogen-containing base being a nitrogen-containing heterocyclic compound, a guanidine compound, or a trialkylamine compound.

Embodiment 14 relates to cationic polymers according to Embodiments 1 to 13, wherein the cationic nitrogen-containing group is a cationic nitrogen-containing heterocyclic group comprising a first heterocyclic ring that is saturated or unsaturated and that has 5 or 6 ring members with at least one ring member being nitrogen, the first heterocyclic ring is optionally fused to a second ring that is carbocyclic or heterocyclic and that is saturated or unsaturated.

Embodiment 15 relates to cationic polymers according to any of Embodiments 13 or 14, wherein the cationic nitrogen-containing heterocyclic group is of Formula (VIB)

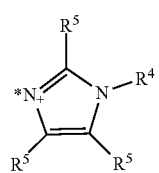

(VIB)

wherein
the asterisk (*) indicates an attachment position to the linking group L;
$R^4$ is an alkyl or allyl; and
each $R^5$ are independently hydrogen, an alkyl, or two $R^5$ groups on adjacent carbon atoms are joined to form a second ring that is carbocyclic or heterocyclic and that is saturated or unsaturated.

Embodiment 16 relates to cationic polymers according to any of Embodiments 13 or 14, wherein the cationic nitrogen-containing heterocyclic group is of Formula (VIC)

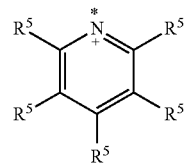

(VIC)

wherein
the asterisk (*) indicates an attachment position to the linking group L; and
each $R^5$ are independently hydrogen or an alkyl or two $R^5$ groups on adjacent carbon atoms are joined to form a second ring that is carbocyclic or heterocyclic and that is saturated or unsaturated.

Embodiment 17 relates to cationic polymers according to Embodiment 13, wherein +$R^3$ is a nitrogen-containing group derived from a nitrogen-containing base that is a guanidine compound.

Embodiment 18 relates to cationic polymers according to Embodiment 13, wherein the cationic nitrogen-containing group is of Formula (VID)

(VID)

wherein
each $R^6$, $R^7$, and $R^8$ are independently an alkyl.

Embodiment 19 relates to a membrane comprising the cationic polymer of any of Embodiments 1 to 18.

Embodiment 20 relates to the membrane of Embodiment 19 further comprising a reinforcement material.

Embodiment 21 relates to the membranes of Embodiments 19 or 20, wherein the membrane is an anion exchange membrane.

Embodiment 22 relates to the membranes of any of Embodiments 19 to 21, wherein the membrane has ion exchange capacity from 1 to 3 milliequivalents per gram of membrane.

Embodiment 23 relates to an electrochemical device comprising:
an anode;
a cathode; and
a membrane positioned between the anode and cathode, wherein the membrane is according to any of embodiments 19 to 22.

Embodiment 24 relates to the electrochemical device according to Embodiment 23, wherein the electrochemical device is a fuel cell, an electrolyzer, a battery, or an electrodialysis cell.

Embodiment 25 relates to a method of making a nitrogen-containing copolymer, the method comprising:

a) obtaining or providing a precursor polymer that is a random or block copolymer comprising at least 10 to 50 mole percent of monomeric units according to Formula (I)

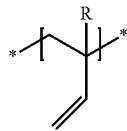
(I)

wherein
R is hydrogen or methyl; and
an asterisk (*) indicate an attachment position to another monomeric unit;

b) reacting the precursor polymer comprising monomeric units of Formula (I) with an organic silane of Formula (II)

$$HSi(R^2R^2)\text{-}L\text{-}X \qquad (II)$$

to obtain a polymer intermediate comprising monomeric units of Formula (III)

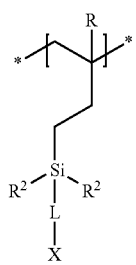
(III)

wherein
each $R^2$ are independently an alkyl, aryl, or a combination thereof;

L is a linking group comprising an alkylene group; and
X is a leaving group; and d) reacting the polymer intermediate comprising monomeric units of Formula (III) with $R^3$, which is a nitrogen-containing base free of any N—H bonds, to obtain a cationic polymer comprising monomeric units of Formula (V)

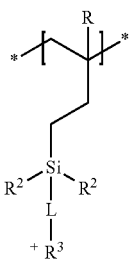
(V)

wherein
$+R^3$ is a cationic nitrogen-containing group free of any N—H bonds.

Examples

Advantages and embodiments of this disclosure are further illustrated by the following examples, but the materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, WI, or Alfa Aesar; Ward Hill, MA or known to those skilled in the art unless otherwise stated or apparent.

Foreseeable modifications and alterations of this invention will be apparent to those skilled in the art without departing from the scope of this invention. This invention should not be restricted to the embodiments that are set forth in this application for illustrative purposes.

TABLE 1

| List of materials used from example preparation | | |
|---|---|---|
| MATERIAL | ABBREVIATION | DESCRIPTION |
| 1,1,4,4-Tetramethyl-1,4-disilabutane | — | Product no. SIT7537.0 from Gelest, Inc., Morrisville, Pennsylvania |
| Vinylbenzylchloride | — | Product no. 436877 from Sigma-Aldrich, Milwaukee, Wisconsin |
| 4-Bromobutyldimethylchlorosilane | — | Product no. SIB 1879.2 from Gelest, Inc., Morrisville, Pennsylvania |
| Chloropropyldimethylsilane | — | Product no. SIC2340.0 from Gelest, Inc., Morrisville, Pennsylvania |
| Platinum divinyltetramethyl-disiloxane complex | — | Product no. SIP6830.3 from Gelest, Inc., Morrisville, Pennsylvania |
| Styrene-butadiene block copolymer | SBS | Product KRATON D1192 from Kraton Polymers US, Houston, Texas |
| Sodium borohydride | — | Product no. S0480 from TCI America, Portland, Oregon |
| Tetramethylimidazole | TMIM | Product no. T0971 from TCI America, Portland, Oregon |
| Trimethylamine | TMA | Product no. H32899 from Alfa Aesar, Ward Hill, Massachusetts |
| N-Butyldimethylamine | — | Product no. D1506 from TCI America, Portland, Oregon |

TABLE 1-continued

List of materials used from example preparation

| MATERIAL | ABBREVIATION | DESCRIPTION |
| --- | --- | --- |
| 1N Potassium hydroxide solution <1 ppm metals | KOH | Obtained from J. T. Baker, Baker Analyzed Reagent, VWR Scientific, Radnor, Pennsylvania |
| Deuterated chloroform | CDCl$_3$ | Obtained from Cambridge Isotope Laboratories, Inc., Andover, Massachusetts |
| Deuterated methanol | CD$_3$OD | Obtained from Cambridge Isotope Laboratories, Inc., Andover, Massachusetts |
| Silica gel 60 (150-230 mesh/500-600 m$^2$/g) | — | Product no. 42727 obtained from Alfa Aesar, Ward Hill, Massachusetts |
| 4A Molecular sieves | — | Product no. 334294 from Sigma-Aldrich, Milwaukee, Wisconsin |
| Di-n-butylmagnesium | — | Product no. 345113 (1M in heptane) from Sigma Aldrich Co. LLC., St. Louis, Missouri |
| Isoprene | — | Product no. L14619 from Alfa Aesar, Ward Hill, Massachusetts |
| Styrene | | A14434 from Alfa Aesar, Ward Hill, Massachusetts |
| Sec-butyl lithium | — | Product no. 718-01 (12 wt. % in cyclohexane) from FMC Lithium/Livent, Philadelphia, Pennsylvania |
| 1,2-Dipiperidinoethane | DIPIP | Obtained from Sigma-Aldrich, Milwaukee, Wisconsin |
| Cyclohexane | — | Anhydrous grade obtained from Sigma-Aldrich, Milwaukee, Wisconsin |
| Isopropanol | IPA | Obtained from VWR International, Batavia, Illinois. |

Preparation of Organosilane 1

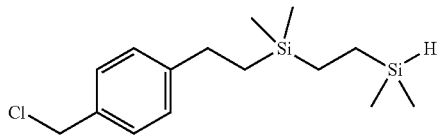 [SMILES: C[SiH](C)CC[Si](C)(C)CCc1ccc(CCl)cc1]

Platinum divinyltetramethyldisiloxane complex (1 drop, 3-3.5 wt. % Pt in vinyl-terminated polydimethylsiloxane) was added to a solution of 1,1,4,4-tetramethyl-1,4-disilabutane (4.40 grams, 0.030 mol) and vinylbenzyl chloride (5.73 grams, 0.038 mol) in toluene (60 mL). After an initial exotherm, the reaction mixture was stirred at room temperature for 24 hours, and toluene was removed in vacuo to give the product shown above and its regio-isomer as a colorless oil in a 62/38 molar ratio confirmed by NMR analysis.

Membrane Polymer E1

A 250-mL 3-necked round bottom flask equipped with magnetic stirring, heating mantle, thermocouple, and inlet for nitrogen blanketing was charged with 3.45 grams polystyrene-polybutadiene block copolymer (26 wt. % 1,2-butadiene units, $M_n$=151,000 Daltons, 16.58 mmol 1,2-butadiene units) and toluene (16 grams), and the copolymer was dissolved with stirring at 60° C. for 30 minutes. Organosilane 1 (5.00 grams, 16.73 mmol) and platinum divinyltetramethyldisiloxane complex (1 drop, 3-3.5 wt. % Pt in vinyl-terminated polydimethylsiloxane) were added, and the mixture was stirred at 70° C. for 48 hours. Analysis of a sample removed showed that the desired organosilane-functionalized copolymer intermediate was present; NMR showed 87% hydrosilylation of 1,2-butadiene units; GPC (toluene): $M_n$=200,000 Daltons, $M_W$=226,000 Daltons, polydispersity=1.13; and DSC (10° C. min−1, N$_2$): −58° C. (T$_g$).

The reaction was continued by adding a solution of N-butyldimethylamine (1.68 grams, 16.58 mmol) in ethanol (4 grams) and stirred at 70° C. for 3 days. The reaction mixture was precipitated into ethyl acetate (10 mL) and the precipitate was washed three times with additional ethyl acetate (3×10 mL). After drying (3 hours, 120° C.), the desired product was obtained as a white elastomeric solid. DSC (10° C. min−1, N$_2$): −16° C. (T$_g$).

Membrane Polymer E2

A 100-mL 3-necked round bottom flask equipped with magnetic stirring, heating mantle, thermocouple, and inlet for nitrogen blanketing was charged with 1.38 grams polystyrene-polybutadiene block copolymer (26 wt. % 1,2-butadiene units, 6.63 mmol 1,2-butadiene units) and toluene (10 grams), and the copolymer was dissolved with stirring at 60° C. for 30 minutes. Organosilane 1 (2.00 grams, 6.69 mmol) and platinum divinyltetramethyldisiloxane complex (1 drop, 3-3.5 wt. % Pt in vinyl-terminated polydimethylsiloxane) were added, and the mixture was stirred at 70° C. for 48 hours.

The reaction was continued by adding a solution of tetramethylimidazole (0.82 grams, 6.63 mmol) in ethanol (2.5 grams) and stirred at 70° C. for 4 days. The reaction mixture was precipitated into ethyl acetate (10 mL) and the precipitate was washed three times with additional ethyl acetate (3×10 mL). After drying (3 hours, 120° C.), the desired product was obtained as a white elastomeric solid. DSC (10° C. min−1, N$_2$): −35° C. (T$_g$).

Membrane Polymer E3

A 100-mL 3-necked round bottom flask equipped with magnetic stirring, heating mantle, thermocouple, and inlet for nitrogen blanketing was charged with 1.88 grams polystyrene-polybutadiene block copolymer (26 wt. % 1,2-butadiene units, 9.13 mmol 1,2-butadiene units) and toluene (18 grams dried over 4A molecular sieves), and the copolymer was dissolved with stirring at 60° C. for 30 minutes. Organosilane 1 (2.73 grams, 9.13 mmol) and platinum divinyltetramethyldisiloxane complex (1 drop, 3-3.5 wt. % Pt in vinyl-terminated polydimethylsiloxane) were added, and the mixture was stirred at 70° C. for 48 hours. The reaction mixture was cooled to room temperature, and sparged with nitrogen.

The reaction was continued by adding trimethylamine (0.54 grams, 9.13 mmol, 9.1 mL of a 1M solution in THF) and stirred at room temperature for 3 days. Solvents were removed in vacuo to give the desired product as a white elastomeric solid which was washed three times with deionized water (3×10 mL) and dried (3 hours, 120° C.). DSC (10° C. min−1, $N_2$): −17° C. ($T_g$).

Preparation of Organosilane 2

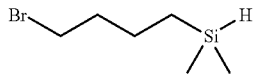

A 250-mL 3-necked round bottom flask equipped with magnetic stirring, heating mantle, thermocouple, and inlet for nitrogen blanketing was charged with sodium borohydride (3.91 grams, 0.103 mole) and acetonitrile (40 mL). Glassware was pre-dried at 140° C., solvents were dried over 4A molecular sieves, and sodium borohydride was stored and handled in a nitrogen glove bag. 4-Bromobutyldimethylchlorosilane (11.87 grams, 0.052 mole) was added dropwise to the flask under nitrogen, an exothermic reaction occurred, and the reaction mixture was stirred for 15 mins at room temperature. Acetonitrile was removed in vacuo at room temperature, 50 mL hexane was added, and the resulting suspension was passed through silica gel in a sintered glass funnel (4-8 micron). Hexane was removed from the filtrate in vacuo to give the desired product as a clear colorless oil, confirmed by NMR analysis ($CDCl_3$).

Membrane Polymer E4

A 100-mL 3-necked round bottom flask equipped with magnetic stirring, heating mantle, thermocouple, and inlet for nitrogen blanketing was charged with Organosilane 2 (2.28 grams, 11.7 mmol), 2.43 grams polystyrene-polybutadiene block copolymer (26 wt. % 1,2-butadiene units, 11.7 mmol 1,2-butadiene units and toluene (15 mL), and the copolymer was dissolved with stirring at 60° C. for 30 minutes. Platinum divinyltetramethyldisiloxane complex (1 drop, 3-3.5 wt. % Pt in vinyl-terminated polydimethylsiloxane) was added, and the mixture was stirred at 60° C. for 48 hours. Analysis of a sample removed showed that the desired organosilane-functionalized copolymer intermediate was present; NMR showed 65% hydrosilylation of 1,2-butadiene units); GPC (toluene): $M_n$=12,000 Daltons $M_w$=76,000 Daltons, polydispersity=6.2; DSC (10° C. min−1, $N_2$): −74° C. ($T_g$).

The reaction was continued by adding trimethylamine (0.88 grams, 14.9 mmol, 15 mL, 28 mol % excess of a 1M solution in THF) and stirred at room temperature for 3 days. Solvents were removed in vacuo to give the desired product as a white elastomeric solid which was washed three times with deionized water (3×10 mL) and dried (3 hours, 120° C.). DSC (10° C. min−1, $N_2$): −49° C. ($T_g$).

Membrane Polymer E5

A 250-mL 3-necked round bottom flask equipped with magnetic stirring, heating mantle, thermocouple, and inlet for nitrogen blanketing was charged with 8.64 grams polystyrene-polybutadiene block copolymer (23 wt. % 1,2-butadiene units, 0.0367 mol 1,2-butadiene units) and toluene (55 grams), and the copolymer was dissolved with stirring at 60° C. for 30 min. Chloropropyldimethylsilane (5.02 grams, 0.0367 mol) and platinum divinyltetramethyldisiloxane complex (1 drop, 3-3.5 wt. % Pt in vinyl-terminated polydimethylsiloxane) were added, and the mixture was stirred at 70° C. for 48 hours. Analysis of a sample showed that the desired organosilane-functionalized copolymer intermediate was present; NMR showed 82% hydrosilylation of 1,2-butadiene units); GPC (toluene): $M_n$=250,000 Daltons, $M_w$=464,000 Daltons, polydispersity=1.85; DSC (10° C. min−1, $N_2$): −65° C. ($T_g$).

The reaction was continued by adding a solution of N-butyldimethylamine (3.71 grams, 0.0367 mmol) in 4/1 v/v toluene-methoxypropanol (25 grams) and stirred at 70° C. for 14 days, followed by 92° C. for 5 days. Solvents were removed in vacuo to give the product as a light brown elastomeric solid which was washed three times with deionized water (3×20 mL) and dried (3 hours, 120° C.).

Membrane Polymer E6

Polymer synthesis and reagent manipulations are conducted in a MBraun Labmaster SP glovebox (MBraun Inc., Stratham, NH, USA) or in custom glassware designed to enable anionic polymerizations (for example, see Ndoni et al., Laboratory-scale Setup for Anionic Polymerization under Inert Atmosphere, *Review of Scientific Instruments*, 66(2), 1090-1095 (1995)). Standard air-free techniques are used for reagent manipulations.

Styrene is stirred over calcium hydride overnight, is degassed with three freeze-pump-thaw cycles and is then vacuum-transferred into a Schlenk bomb containing dried dibutylmagnesium. After stirring overnight in an argon atmosphere, styrene is again vacuum-transferred into a receiving flask to afford a final, dry monomer. Isoprene is dried as detailed for styrene, with sequential vacuum transfers from calcium hydride and dibutyl-magnesium. 2 Dipiperidinoethane is purified by vacuum distillation from calcium hydride. Cyclohexane solvent is purified via solvent purification system (Pure Process Technology, LLC, Nashua, New Hampshire). All other chemicals are used as received.

In a glovebox, cyclohexane (600 mL) is combined with sec-butyllithium (0.41 mL, 0.6 mmol) and stirred in a 1 L flask. After 10 minutes, styrene (0.12 mL) is added and the reaction is cooled to 10° C. DIPIP (0.225 mL) is then added and the reaction is allowed to stir for fifteen minutes before the addition of isoprene (45.0 g). After 16 hours, the polymerization is quenched with degassed IPA (5 mL) prior to isolation by precipitation from IPA (~1 L). A viscous, colorless product is obtained after drying under reduced pressure.

Block copolymer E6 is then used as a starting material for the preparation of membrane polymers by hydrosilylation of pendant alkene groups with a halosilane followed by quaternization with a nitrogen compound. The methods described in examples E1 to E5 are followed and the products are characterized by NMR.

Characterization by NMR

NMR samples were analyzed as solutions in deuterated chloroform or in mixtures of deuterated chloroform and deuterated methanol. NMR spectroscopy was conducted using a Bruker AVANCE III 500 MHz NMR spectrometer equipped with a CPBBO gradient cryoprobe, a Bruker B-ACS 60 autosampler, and Bruker Topspin 3.04 software. Quantitative proton NMR spectra were recorded with a 15° $^1$H excitation pulse and acquisition time of 4 seconds. Two-dimensional (2D)$^1$H-$^{13}$C NMR spectra were also collected to confirm the spectral assignments and were recorded in the HSQC (Heteronuclear Single Quantum Coherence) adiabatic material sweep width mode. Spectra were analyzed using Advanced Chemistry Development software (Toronto, Canada). Analysis of the chemical shifts and integrals in the spectra gave the styrene/1,2-butadiene/1,4-butadiene ratio in SBS, confirmed the formation of Organosilanes 1 and 2, the hydrosilylated intermediate block copolymers and the final ionomeric products E1-E5. Analysis of integrals also generated mole % values for the conversion of haloalkyl groups to ionomeric (nitrogen cation) groups in E1-E5.

Characterization by GPC

Solutions of approximate concentration 1.5 mg/mL were prepared in toluene. The samples were swirled on an orbital shaker for 12 hrs. The sample solutions were filtered through 0.45 µPTFE syringe filters and then analyzed by GPC. An Agilent (Santa Clara, CA) 1260 LC instrument was used with an Agilent "PLgel MIXED B+C" column at 40° C., toluene eluent at 1.0 mL/min, a NIST polystyrene standard (SRM 705a), and an Agilent 1260 Evaporative Light Scattering Detector.

Characterization by DSC

DSC samples were prepared for thermal analysis by weighing and loading the material into TA Instruments aluminum DSC sample pans. The specimens were analyzed using the TA Instruments Discovery Differential Scanning Calorimeter (DSC-SN DSC1-0091) utilizing a heat-cool-heat method in standard mode (−155° C. to about 50° C. at 10° C./min.). After data collection, the thermal transitions were analyzed using the TA Universal Analysis program. The glass transition temperatures were evaluated using the step change in the standard heat flow (HF) curves. The midpoint (half height) temperature of the second heat transition is quoted.

Preparation of Membranes

Membranes E1 to E4 (reported in Table 2) were prepared by coating 15-40 weight percent solids ionomer solutions in 4/1 v/v toluene-ethanol onto to a release liner with a polyethylene terephthalate backing coated with an acrylic-based release layer as described in U.S. Pat. No. 7,816,477 (Suwa et al.). Membrane CE1 was cast from toluene solution. Membranes were coated using a BYK BYKO-drive automatic applicator (Gardco) at a speed setting of 1 inch/sec (2.54 cm/sec) and with a notch bar applicator having a 10 mil (0.01 inch, 0.254 mm) gap, and then dried in a forced air oven at 80° C. for 30 minutes. Measured dry coating thicknesses were in the range of 35-70 microns.

TABLE 2

Membrane Preparation

| MEMBRANE POLYMER | COMPOSITION | % CONVERSION (Halo to quaternary ammonium) | MAXIMUM ION EXCHANGE CAPACITY, mmol/g of nitrogen cations |
|---|---|---|---|
| CE1 | SBS Triblock | NA | 0 |
| E1 | Benzyl N-Butyldimethylamine | 97 | 1.64 |
| E2 | Benzyl TMIM | 78 | 1.58 |
| E3 | Benzyl TMA | 89 | 1.76 |
| E4 | Butyl TMA | 79 | 2.17 |
| E5 | Propyl N-Butyldimethylamine | 58 | 2.11 |

Tensile Testing of Membranes

The tensile stress-strain behavior of membranes was examined at a constant strain rate of 2 mm/second. Dry samples were removed from the release liner and prepared by cutting into 1.00 cm×4.00 cm strips. Wet samples were removed from the release liner and soaked in aqueous 1M KOH solution for 24 hours at room temperature, thoroughly washed with deionized water, cut into 1.00 cm×4.00 cm strips, and tested in a fully hydrated state. A TA XTPlus Texture Analyzer (Texture Technologies, Hamilton, MA) was used. Four strips were cut and tensile tested for each membrane. The mean values from the four replicates are reported in Tables 3 and 4. For wet samples, the dimensions of the membranes (x, y, z) were measured before and after the alkali soak in order to calculate swelling values.

The results in Tables 3 and 4 show that the ionomeric membrane polymers maintain the elastomeric properties of their SBS triblock precursor CE1. The results in Table 4 show that the ionomeric membrane polymers maintain their elastomeric properties after exposure to aqueous potassium hydroxide. The tensile performances of CE1 were comparable when tested in the dry state and in the wet state.

TABLE 3

Properties of Membranes

| DRY MEMBRANE | ELONGATION AT BREAK, % | STRESS AT BREAK, MPa | MODULUS, MPa |
|---|---|---|---|
| E1 | 687 | 2.6 | 10 |
| E2 | 713 | 2.9 | 11 |
| E3 | 381 | 2.1 | 17 |
| E4 | 851 | 2.6 | 16 |

TABLE 4

Properties of Membranes

| WET MEMBRANE | ELONGATION AT BREAK, % | STRESS AT BREAK, MPa | MODULUS, MPa | DIMENSIONAL SWELL (x, y), % | DIMENSIONAL SWELL (z), % |
|---|---|---|---|---|---|
| CE1 | 462 | 3.6 | 14 | 0 | 0 |
| E1 | 241 | 1.4 | 10 | 6 | 38 |
| E2 | 294 | 1.7 | 27 | 8 | 41 |
| E4 | 643 | 3.9 | 11 | 4 | 49 |

Conductivity Testing of Membranes

Ionic conductivity was measured using a 4-probe Bekk-Tech BT-110 conductivity clamp (Scribner Associates, Inc., Southern Pines, NC) and a VMP3 Multi-channel potentiostat (Bio-Logic Science Instruments, Seyssinet-Pariset, France). A dry membrane sample in the chloride form (1.40 cm×4.00 cm) was assembled under two platinum wires, and the clamp was immersed into 18 megaohms deionized water for 2 hours before measurement to hydrate and swell the membrane. A current-voltage curve was recorded by applying a linear voltage sweep from an open circuit voltage (OCV) to 0.3 V first, then to −0.3 V, and finally back to OCV at 10 mV/second scan rate. Ionic conductivity was calculated from the slope of the resulting current-voltage curve using the measured dry membrane size and thickness, and an ionic conductivity clamp constant of 0.425 cm.

The results in Table 5 show that ionomeric membrane polymers are conductive, while non-functionalized SBS (CE1) membrane is non-conductive.

TABLE 5

Conductivity of Membranes

| MEMBRANE | CONDUCTIVITY IN CL⁻ FORM, mS/cm |
|---|---|
| CE1 | 0 |
| E1 | 9.1 |
| E2 | 10.3 |
| E3 | 12.2 |
| E4 | 8.0 |

Intentionally Left Blank

What is claimed is:

1. A cationic polymer comprising monomeric units of Formula (V):

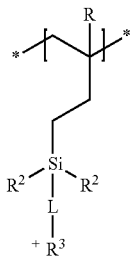

(V)

wherein
an asterisk (*) indicates an attachment position to another monomeric unit;
R is hydrogen or methyl;
each $R^2$ is independently an alkyl, aryl, or a combination thereof;
L is a linking group comprising an alkylene group; and
$+R^3$ is a cationic nitrogen-containing group that is free of any N—H bonds,
wherein L does not include any siloxane groups.

2. The cationic polymer according to claim 1, having from 10 to 50 mole percent of monomeric units of formula (V) based on total moles of monomeric units in the cationic polymer.

3. The cationic polymer according claim 1 further comprising monomeric units derived from styrene-type monomers, 1,4-butadiene, 3,4-isoprene, cis-1,4-isoprene, trans-1,4-isoprene, or combinations thereof.

4. The cationic polymer according to claim 1, wherein L optionally further comprises an arylene group, an —Si$(R^2)_2$— groups, another alkylene group, or a combination thereof.

5. The cationic polymer according to claim 1, wherein L optionally further comprises one or more —Si$(R^2)_2$— groups.

6. The cationic polymer according to claim 1, wherein $+R^3$ is derived from a nitrogen-containing base that is free of a N—H bond, the nitrogen-containing base being a nitrogen-containing heterocyclic compound, a guanidine compound, or a trialkylamine compound.

7. The cationic polymer according to claim 1, wherein the cationic nitrogen-containing group is a cationic nitrogen-containing heterocyclic group comprising a first heterocyclic ring that is saturated or unsaturated and that has 5 or 6 ring members with at least one ring member being nitrogen, the first heterocyclic ring being optionally fused to a second ring that is carbocyclic or heterocyclic and that is saturated or unsaturated.

8. The cationic polymer according to claim 7, wherein the cationic nitrogen-containing heterocyclic group is of Formula (VIB)

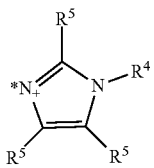

(VIB)

wherein
the asterisk (*) indicates an attachment position to the linking group L;
$R^4$ is an alkyl or allyl; and
each $R^5$ is independently hydrogen or an alkyl or two $R^5$ groups on adjacent carbon atoms of the ring join to form a second ring that is carbocyclic or heterocyclic and that is saturated or unsaturated.

9. The cationic polymer according to claim 7, wherein the cationic nitrogen-containing heterocyclic group is of Formula (VIC)

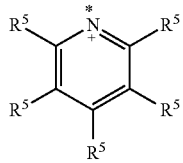

(VIC)

wherein
an asterisk (*) indicates an attachment position to the linking group L; and
each $R^5$ is independently hydrogen or an alkyl or two $R^5$ groups on adjacent carbon atoms of the ring join to form a second ring that is carbocyclic or heterocyclic and that is saturated or unsaturated.

10. The cationic polymer according to claim 1, wherein the cationic nitrogen-containing group is of Formula (VID)

$$*NR^6R^7R^8 \quad (VID)$$
$+$ wherein
the asterisk (*) indicates an attachment position to the linking group L; and
each $R^6$, $R^7$, and $R^8$ are independently an alkyl.

11. A membrane comprising the cationic polymer of claim 1.

12. The membrane of claim 11, wherein the membrane has a positive charge density from 1 to 3 milliequivalents per gram of membrane.

13. An electrochemical device comprising:
an anode;
a cathode; and
a membrane positioned between the anode and cathode, wherein the membrane is according to claim 11.

14. The electrochemical device according to claim 13, wherein the electrochemical device is a fuel cell, an electrolyzer, a battery, or an electrodialysis cell.

15. A method of making a nitrogen-containing copolymer, the method comprising:
a) obtaining or providing a precursor polymer that is a random or block copolymer comprising at least 10 to 50 mole percent of monomeric units according to Formula (I)

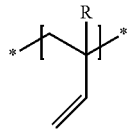

(I)

based on a total weight of monomeric units in the precursor polymer,
wherein
R is hydrogen or methyl; and
an asterisk (*) indicate an attachment position to another monomeric unit;

b) reacting the precursor polymer with an organic silane of Formula (II)

$$HSi(R^2R^2)\text{-}L\text{-}X \quad (II)$$

to obtain a polymer intermediate comprising monomeric units of Formula (III)

(III)

wherein
each $R^2$ is independently an alkyl, aryl, or a combination thereof;
L is a linking group comprising an alkylene group; and
X is a leaving group; and
c) reacting the polymer intermediate comprising monomeric units of Formula (III) with $R^3$, which is a nitrogen-containing base free of any N—H bonds, to obtain a cationic polymer comprising monomeric units of Formula (V)

(V)

wherein
$+R^3$ is a cationic nitrogen-containing group free of any N—H bonds.

* * * * *